US010023217B2

(12) United States Patent
Sack et al.

(10) Patent No.: US 10,023,217 B2
(45) Date of Patent: Jul. 17, 2018

(54) INFANT STROLLER APPARATUS

(71) Applicant: Wonderland Switzerland AG, Steinhausen (CH)

(72) Inventors: Daniel A. Sack, Pottstown, PA (US); Ryan N. Miller, Lancaster, PA (US); Curtis M. Hartenstine, Birdsboro, PA (US)

(73) Assignee: Wonderland Switzerland AG (CH)

( * ) Notice: Subject to any disclaimer, the term of this patent is extended or adjusted under 35 U.S.C. 154(b) by 0 days.

(21) Appl. No.: 15/379,536

(22) Filed: Dec. 15, 2016

(65) Prior Publication Data

US 2017/0174244 A1    Jun. 22, 2017

Related U.S. Application Data

(60) Provisional application No. 62/269,943, filed on Dec. 19, 2015.

(51) Int. Cl.
*B32B 7/10* (2006.01)
*B62B 7/06* (2006.01)
(Continued)

(52) U.S. Cl.
CPC ............... *B62B 7/062* (2013.01); *B62B 7/10* (2013.01); *B62B 9/12* (2013.01); *B62B 9/20* (2013.01); *B62B 2205/20* (2013.01)

(58) Field of Classification Search
CPC ........... B62B 7/10; B62B 7/044; B62B 7/066; B62B 7/068; B62B 7/064; B62B 9/102;
(Continued)

(56) References Cited

U.S. PATENT DOCUMENTS 6,860,504 B2 * 3/2005 Suga .................. B62B 7/08
280/642
7,717,457 B2 * 5/2010 Bearup ............... A61K 31/409
280/642
(Continued)

FOREIGN PATENT DOCUMENTS

CN     102285367 A     12/2011
CN     202080316 U     12/2011
(Continued)

OTHER PUBLICATIONS

Search Report in co-pending UK Patent Application No. 1621348.0.

*Primary Examiner* — James A Shriver, II
*Assistant Examiner* — Steve Clemmons
(74) *Attorney, Agent, or Firm* — Daniel A. Tallitsch; Baker McKenzie LLP

(57) ABSTRACT

An infant stroller apparatus includes a front leg frame having a first side segment, a handle frame having a second side segment pivotally coupled with the first side segment via a first pivot connection, a rear leg frame having a third and a fourth side segment pivotally coupled with each other via a second pivot connection, the third side segment being further pivotally coupled with the first side segment via a third pivot connection, and the fourth side segment being further pivotally coupled with the second side segment via a fourth pivot connection, a seat portion pivotally coupled with the first side segment via a fifth pivot connection, and a support frame portion respectively coupled with the seat portion and the fourth side segment.

29 Claims, 9 Drawing Sheets

(51) Int. Cl.
*B62B 7/10* (2006.01)
*B62B 9/12* (2006.01)
*B62B 9/20* (2006.01)

(58) Field of Classification Search
CPC .. B62B 9/12; B62B 9/20; B62B 5/066; B62B 2205/20; B62B 2205/25
See application file for complete search history.

(56) References Cited

U.S. PATENT DOCUMENTS

| | | | | |
|---|---|---|---|---|
| 8,870,215 | B2* | 10/2014 | Li | B62B 9/00 280/647 |
| 2011/0291388 | A1* | 12/2011 | Sellers | B62B 7/08 280/647 |
| 2013/0134692 | A1* | 5/2013 | Cheng | B62B 7/062 280/642 |

FOREIGN PATENT DOCUMENTS

| | | | | |
|---|---|---|---|---|
| CN | 204713177 U | | 10/2015 | |
| GB | 2489330 A | * | 9/2012 | ............... B62B 7/08 |
| JP | 2012183848 A | * | 9/2012 | ............. B62B 7/066 |

* cited by examiner

INFANT STROLLER APPARATUS

CROSS-REFERENCE TO RELATED APPLICATION(S)

This application claims priority to U.S. Provisional Patent Application No. 62/269,943 filed on Dec. 19, 2015.

BACKGROUND

1. Field of the Invention

The present invention relates to infant stroller apparatuses.

2. Description of the Related Art

Caregivers usually rely on a stroller apparatus to transport babies and children. A stroller apparatus is typically constructed from a metal frame that comprises the assembly of metal and plastic parts, and a fabric element that connects or wraps around the metal frame. When it is unused, the stroller apparatus can be folded and collapsed for convenient storage or transport. The construction adopted for the folding mechanism of the stroller apparatus plays an important role in the design of the stroller since it has to be safe and convenient to handle in different situations while not affecting the appealing aesthetics of the stroller.

One approach implemented on some existing strollers uses a webbing strap that is connected with a locking device of the folding mechanism. The webbing strap can be pulled to unlock the locking device and allow folding of the stroller frame. Once the stroller frame is collapsed, a separate storage lock is used to keep the stroller frame in the collapsed state. For using the stroller, a caregiver needs to operate the storage lock for unlocking the stroller frame, and then unfold the stroller frame for use. This approach may not be user-friendly, as it requires different operating steps for folding and unfolding the stroller.

Therefore, there is a need for an infant stroller apparatus that can be convenient to fold and unfold, and address at least the foregoing issues.

SUMMARY

The present application describes an infant stroller apparatus that is easy to collapse and unfold. In one embodiment, the infant stroller apparatus includes a front leg frame having a first side segment, a handle frame having a second side segment pivotally coupled with the first side segment via a first pivot connection, a rear leg frame having a third and a fourth side segment pivotally coupled with each other via a second pivot connection, the third side segment being further pivotally coupled with the first side segment via a third pivot connection, and the fourth side segment being further pivotally coupled with the second side segment via a fourth pivot connection, a seat portion pivotally coupled with the first side segment via a fifth pivot connection, and a support frame portion respectively coupled with the seat portion and the fourth side segment.

According to another embodiment, the infant stroller apparatus includes a front leg frame, a handle frame pivotally coupled with the front leg frame, a rear leg frame having two side segments respectively coupled pivotally with the front leg frame and the handle frame, a seat portion pivotally coupled with the front leg frame, a support frame portion respectively coupled pivotally with the seat portion and the rear leg frame, and a latch assembled with the seat portion. The latch is movable to engage with the support frame portion to lock the infant stroller apparatus in either of an unfolded state for use and a collapsed state, the latch being further movable to disengage from the support frame portion for movement of the infant stroller apparatus between the unfolded state and the collapsed state.

DETAILED DESCRIPTION OF THE EMBODIMENTS

Figure 1:
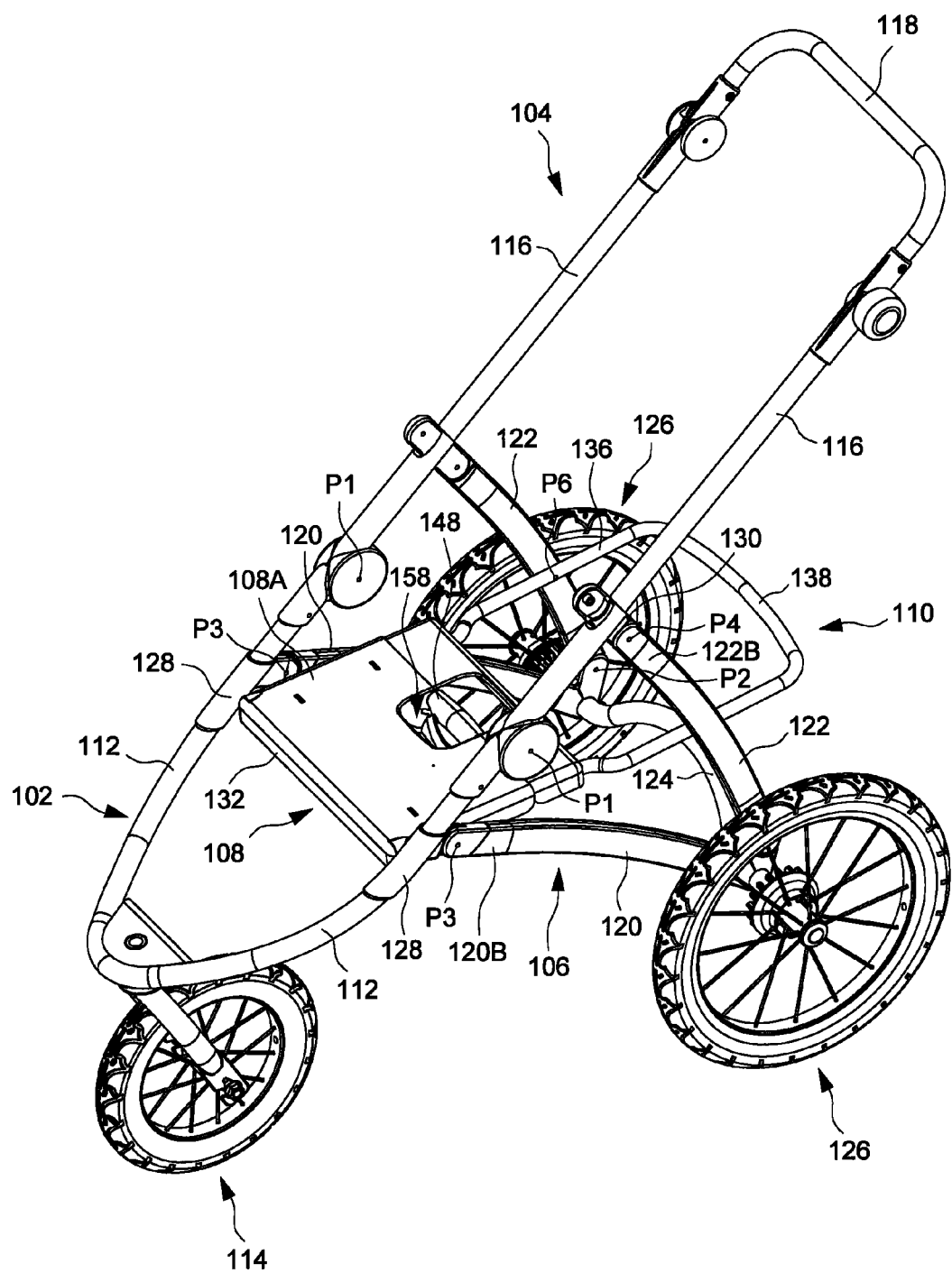
FIG. 1 is a perspective view illustrating an embodiment of an infant stroller apparatus in an unfolded state for use.
Figure 2:
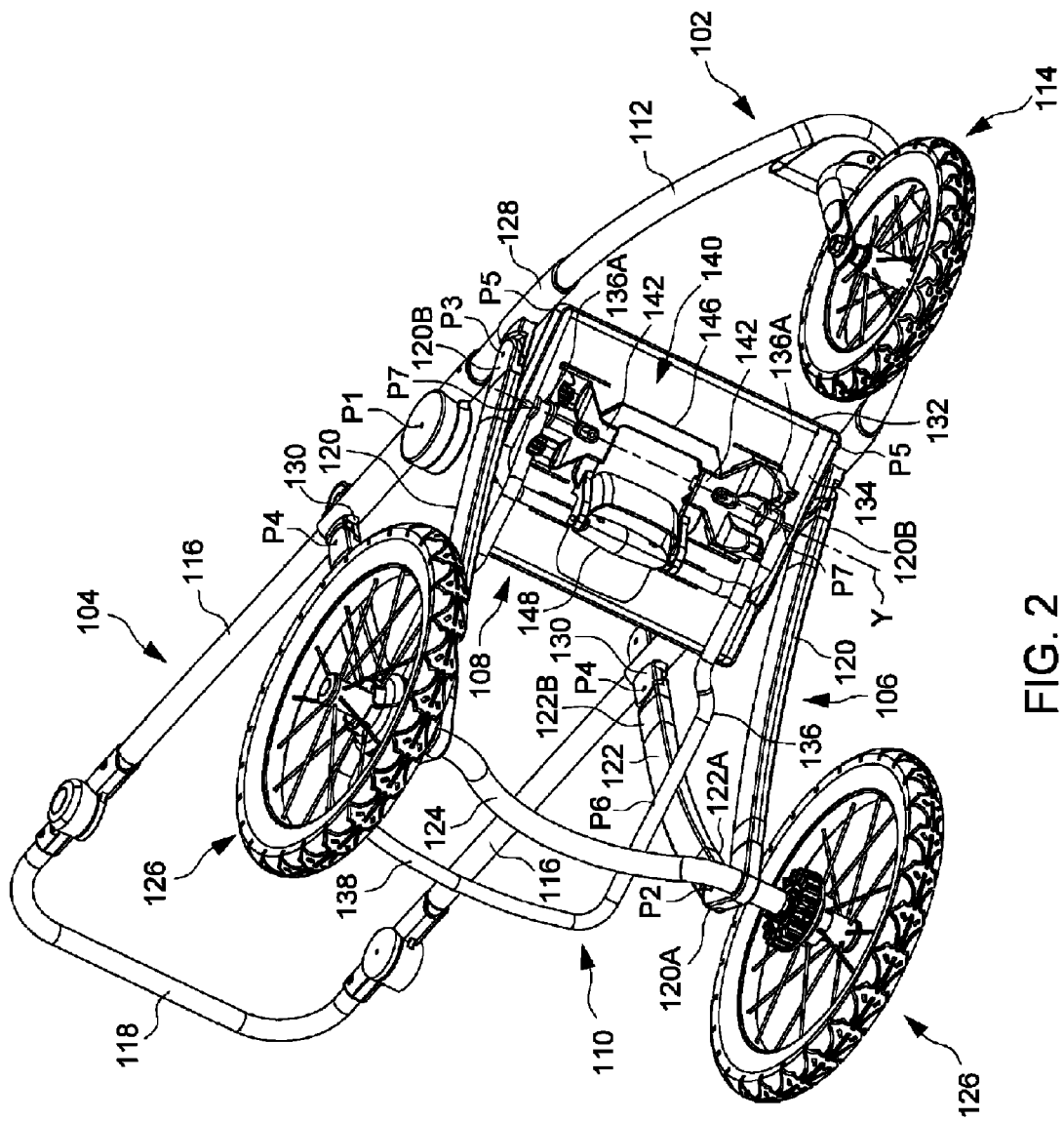
FIG. 2 is another perspective view illustrating the infant stroller apparatus shown in FIG. 1.
Figure 3:
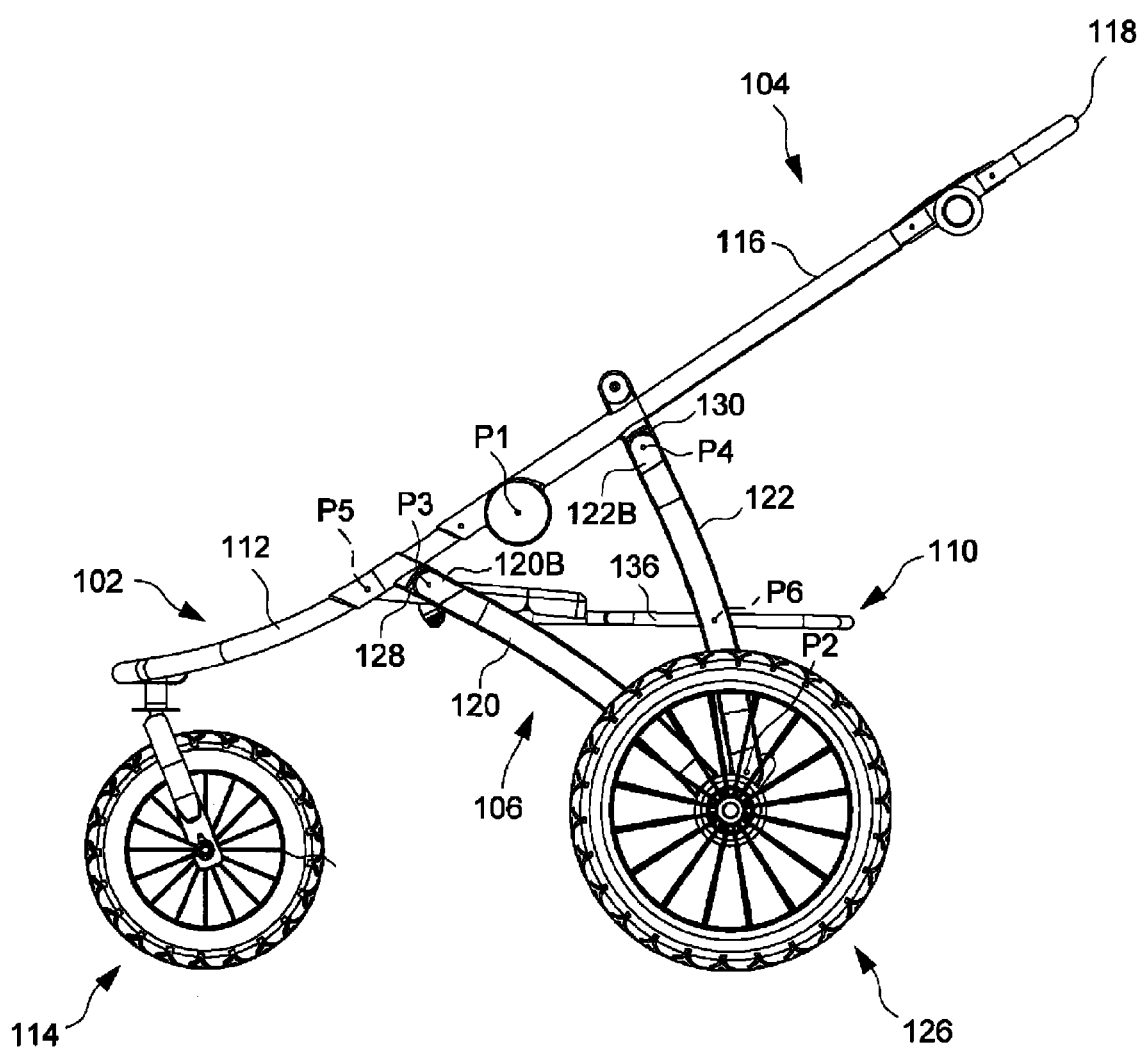
FIG. 3 is a side view of the infant stroller apparatus shown in FIG. 1.

FIGS. 1 and 2 are perspective views illustrating an embodiment of an infant stroller apparatus 100, and FIG. 3 is a side view of the infant stroller apparatus 100. Referring to FIGS. 1-3, the infant stroller apparatus 100 can include a front leg frame 102, a handle frame 104, a rear leg frame 106, a seat portion 108 and a support frame portion 110. The front leg frame 102 can include two side segments 112 respectively disposed at a left and a right side of the infant stroller apparatus 100, and a front wheel assembly 114. The two side segments 112 can converge and join with each other at a front, so that the front leg frame 102 can have a generally V-shape. The front wheel assembly 114 may be attached adjacent to the front portion of the front leg frame 102 where the two side segments 112 join with each other.

The handle frame 104 can include two side segments 116 respectively disposed at the left and right sides of the infant stroller apparatus 100, and a transversal segment 118 connected with the two side segments 116. The end portions of the two side segments 116 distant from the transversal segment 118 can be respectively coupled pivotally with the upper end portions of the two side segments 112 via two pivot connections P1. The two pivot connections P1 can define a pivot axis extending transversally (i.e., from the left side to the right side of the infant stroller apparatus 100) about which the handle frame 104 can freely rotate relative to the front leg frame 102. According to an example of construction, the pivot connections P1 may have no latches for locking the handle frame 104 and the front leg frame 102 in position.

The rear leg frame 106 can include two side segments 120 and 122 disposed at each of the left and right sides of the infant stroller apparatus 100, a transversal segment 124 fixedly connected with the two side segments 120, and two rear wheel assemblies 126. At each of the left and right sides of the infant stroller apparatus 100, the two side segments 120 and 122 are pivotally coupled with each other via a pivot connection P2. For example, each pivot connection P2 can pivotally couple a lower end portion 120A of one side segment 120 with a lower end portion 122A of one side segment 122. The lower end portion 120A of the side segment 120 can be exemplary formed as a bent portion that projects upward from a junction of the side segment 120 with the transversal segment 124. The two pivot connections P2 may be respectively located near the two rear wheel assemblies 126, which are respectively attached to a left and a right end of the transversal segment 124. The two pivot connections P2 can thereby define a pivot axis extending transversally about which the two side segments 120 can rotate relative to the two side segments 122.

Moreover, the two side segments 120 and 122 are respectively coupled pivotally with the side segment 112 of the front leg frame 102 and the side segment 116 of the handle frame 104 via two pivot connections P3 and P4, at each of the left and right sides of the infant stroller apparatus 100. The pivot connection P3 can pivotally couple an upper end portion 120B of the side segment 120 with a coupling part 128 fixedly attached to an intermediate portion of the side segment 112. The pivot connection P4 can pivotally couple an upper end portion 122B of the side segment 122 with a coupling part 130 fixedly attached to an intermediate portion of the side segment 116. The two side segments 120 can thereby rotate relative to the front leg frame 102 about a pivot axis extending transversally that is defined by the two pivot connections P3, and the two side segments 122 can rotate relative to the handle frame 104 about another pivot axis extending transversally that is defined by the two pivot connections P4.

Referring again to FIGS. 1 and 2, the seat portion 108 can include a rigid seat pan 132 and a reinforcing tube 134 fixedly attached to each other. The seat portion 108 can have a seat surface 108A, and the reinforcing tube 134 may be attached at an underside of the seat surface 108A. The seat surface 108A may be defined on the seat pan 132, and can provide rigid support for a child sitting on the seat portion 108. The seat portion 108 is pivotally coupled with the side segment 112 of the front leg frame 102 via a pivot connection P5 at each of the left and right sides of the infant stroller apparatus 100. For example, the two pivot connections P5 can include shaft portions or rivets that pivotally attach a left and a right side of the seat pan 132 to the two side segments 112. The two pivot connections P5 can define a pivot axis extending transversally about which the seat portion 108 can rotate relative to the front leg frame 102.

Referring to FIGS. 1 and 2, the support frame portion 110 can have two side segments 136, and a transversal segment 138 respectively connected with the two side segments 136. The support frame portion 110 comprised of the two side segments 136 and the transversal segment 138 may be a provided as a unitary part. According to one example of implementation, the support frame portion 110 can be a basket frame to which softgoods (not shown) may be fastened for forming a storage basket, which can be thereby suspended from the support frame portion 110. It will be appreciated, however, that the support frame portion 110 may have other functional configurations. For example, the support frame portion 110 may alternatively serve as support for another seat behind the seat portion 108.

The support frame portion 110 is respectively coupled movably with the seat portion 108 and the two side segments 122 of the rear leg frame 106. More specifically, the support frame portion 110 can be pivotally coupled with the two side segments 122 of the rear leg frame 106 via two pivot connections P6 at the left and right sides of the infant stroller apparatus 100, each pivot connection P6 being located between the two pivot connections P2 and P4. The two pivot connections P6 can exemplary couple the two side segments 136 of the support frame portion 110 with the two side segments 122 of the rear leg frame 106, and can define a pivot axis extending transversally about which the support frame portion 110 can rotate relative to the two side segments 122. Moreover, the support frame portion 110 can be pivotally coupled with the seat portion 108 via two pivot connections P7 at the left and right sides of the infant stroller apparatus 100. As better shown in FIG. 2, the two pivot connections P7 can exemplary couple the seat portion 108 with respective end portions 136A of the two side segment 136. The two pivot connections P7 can thereby define a pivot axis Y extending transversally from a left to a right side of the seat portion 108, and the support frame portion 110 can rotate relative to the seat portion 108 about the pivot axis Y.

Figure 4:
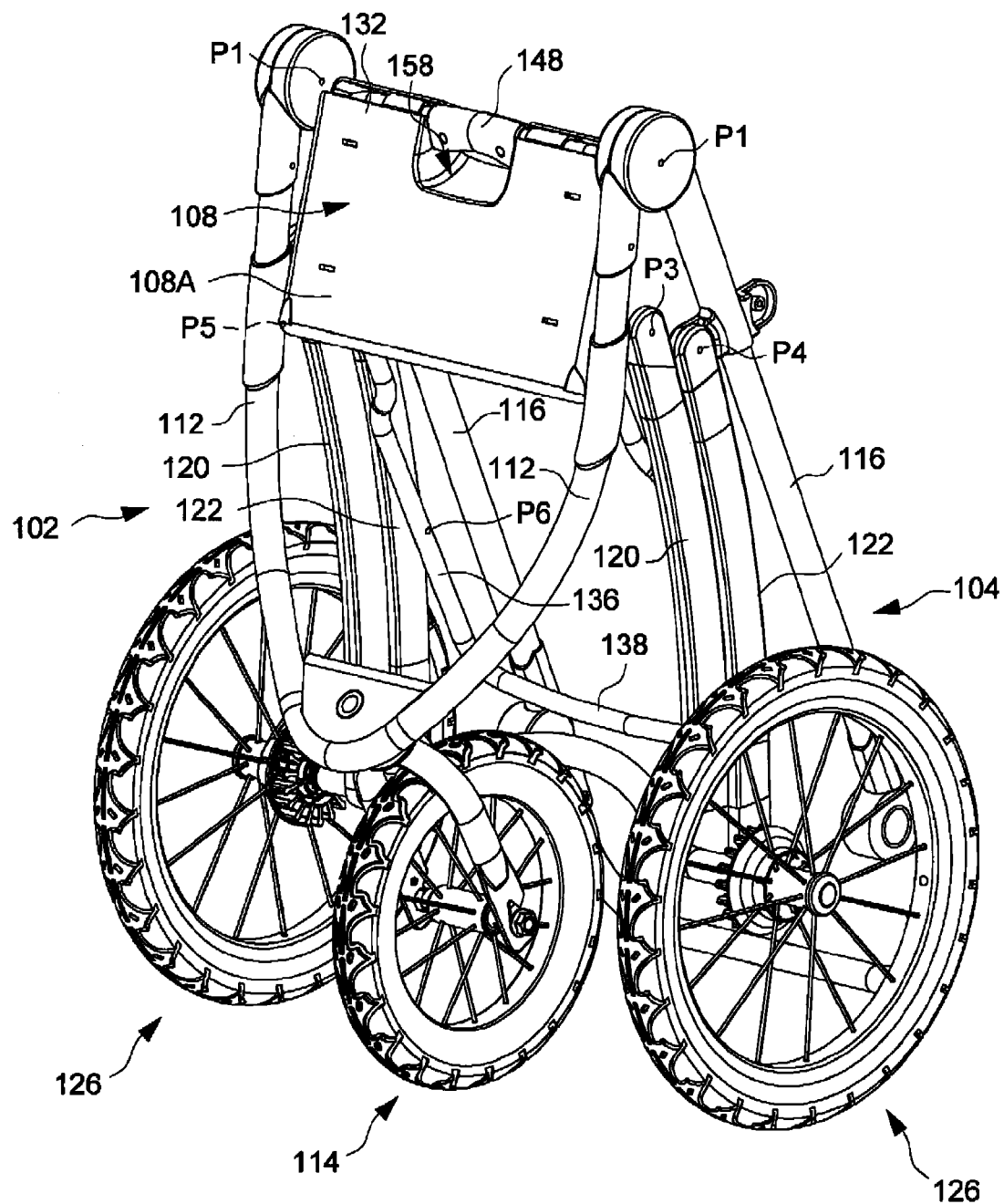
FIG. 4 is a perspective view illustrating the infant stroller apparatus in a collapsed state.

With the aforementioned assembly, the infant stroller apparatus 100 can be expanded to an unfolded state for use as shown in FIGS. 1-3, and folded to a collapsed state as shown in FIG. 4. While the infant stroller apparatus 100 is in the unfolded state, the pivot connection P1 (i.e., coupling the front leg frame 102 with the handle frame 104) is located vertically between the pivot connection P3 (i.e., coupling the front leg frame 102 with the side segment 120 of the rear leg frame 106) and the pivot connection P4 (i.e., coupling the handle frame 104 with the side segment 122 of the rear leg frame 106), and above the pivot connection P3 and the pivot connection P6 (i.e., coupling the support frame portion 110 with the side segment 122 of the rear leg frame 106) on each of the left and right sides. Moreover, the two side segments 120 and 122 of the rear leg frame 106 can open at an angle. The side segments 120 and 122 of the rear leg frame 106, the side segment 112 of the front leg frame 102 and the side segment 116 of the handle frame 104 can thereby define a triangular frame geometry (the pivot connections P2, P3 and P4 being respectively adjacent to the three apexes of the triangular frame geometry) that can assist in maintaining the infant stroller apparatus 100 in the unfolded state. In this unfolded configuration, the front leg frame 102 and the handle frame 104 can extend generally along a same direction, and the support frame portion 110 can extend generally horizontal at a rear of the seat portion 108.

Referring to FIG. 4, while the infant stroller apparatus 100 is in the collapsed state, the front leg frame 102 and the handle frame 104 are folded downward toward each other, and the side segments 120 and 122 of the rear leg frame 106 are positioned substantially parallel and adjacent to each other between the side segments 112 of the front leg frame 102 and the side segments 116 of the handle frame 104. Moreover, the seat portion 108 and the support frame portion 110 are folded toward each other, and the front wheel assembly 114 can be positioned between the two rear wheel assemblies 126. The collapsed infant stroller apparatus 100 has a reduced size, and may stand alone on the front wheel assembly 114 and the two rear wheel assemblies 126.

Figure 5:
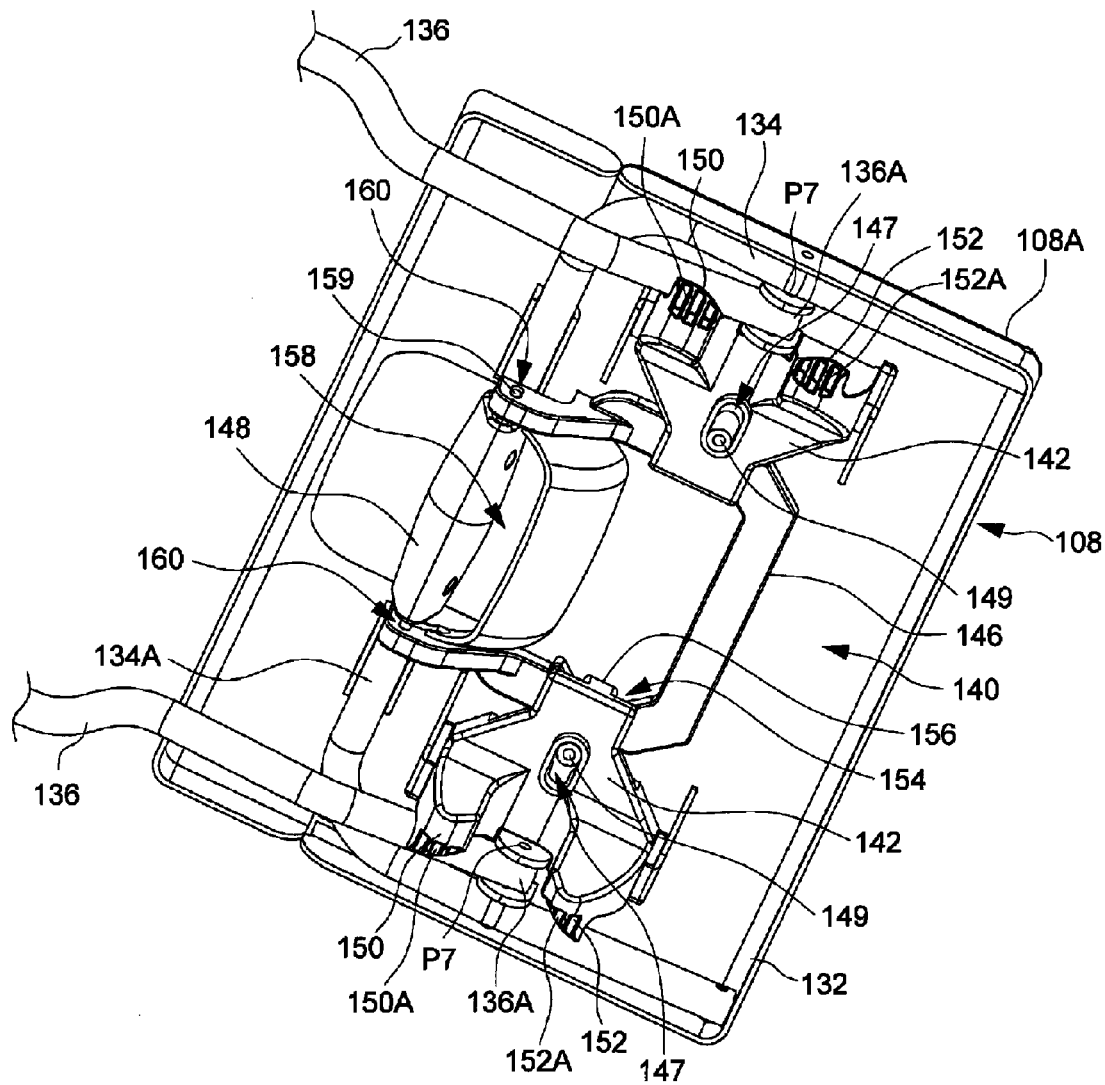
FIG. 5 is a schematic enlarged view illustrating a region of a seat portion of the infant stroller apparatus provided with a latch mechanism.
Figure 6:
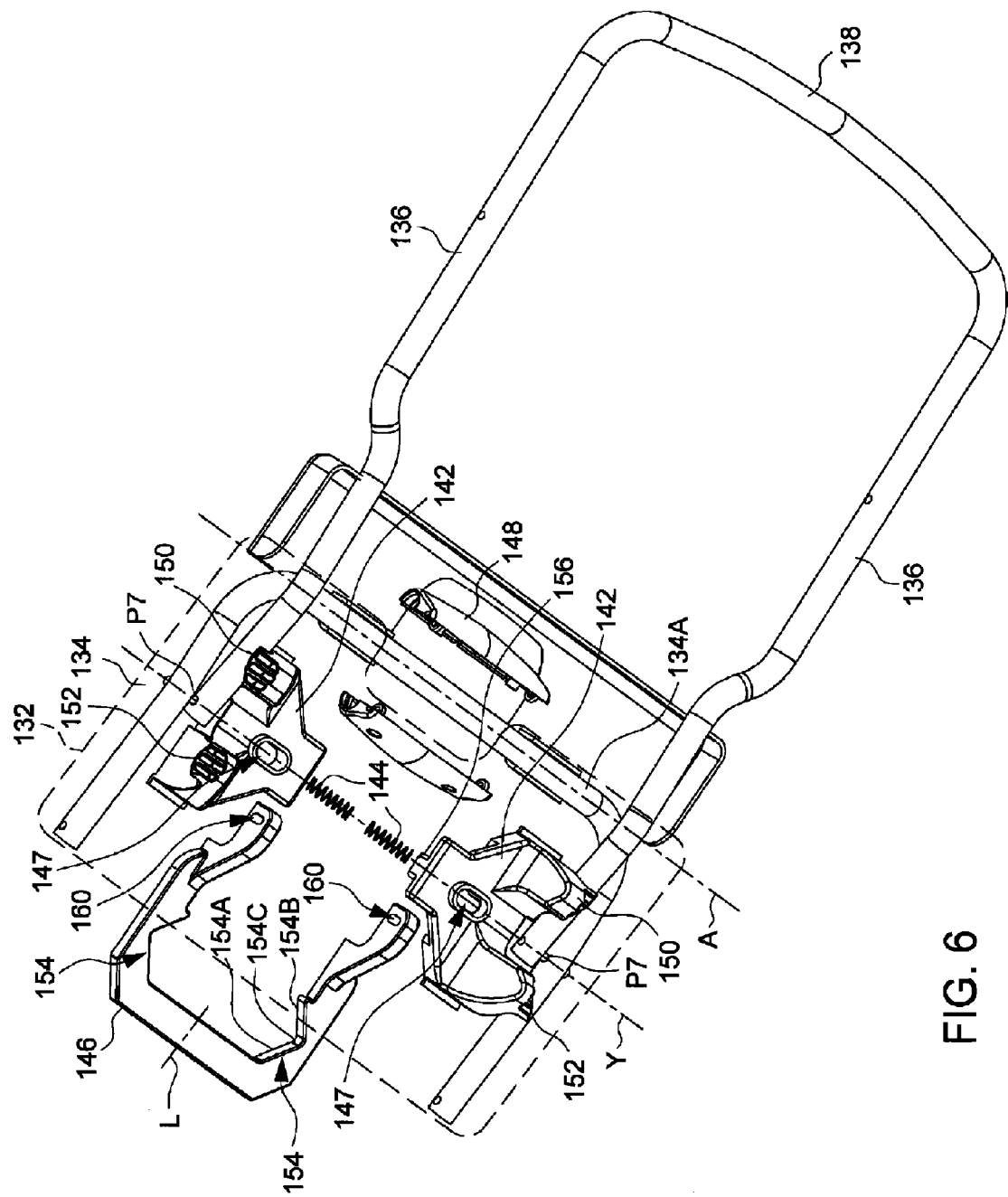
FIG. 6 is an exploded view illustrating the construction of the latch mechanism.

In conjunction with FIG. 2, FIG. 5 is a schematic enlarged view illustrating a region of the seat portion 108 provided with a latch mechanism 140, and FIG. 6 is an exploded view illustrating the construction of the latch mechanism 140. For clarity, the seat pan 132 is schematically represented with phantom lines in FIG. 6. Referring FIGS. 1-6, the infant stroller apparatus 100 can further include a latch mechanism 140 operable to lock the infant stroller apparatus 100 in either of the unfolded and collapsed state. The latch mechanism 140 can be assembled with the seat portion 108, and can include two latches 142, two springs 144, a linking part 146 and a release actuator 148. The two latches 142 can be respectively assembled with the seat portion 108 adjacent to a left and a right side thereof and at an underside of the seat surface 108A. Each of the latches 142 is movable to engage with the support frame portion 110 for locking the infant stroller apparatus 100 in the unfolded state or the collapsed state, and to disengage from the support frame portion 110 for movement of the infant stroller apparatus 100 between the unfolded state and the collapsed state.

Referring to FIGS. 2, 5 and 6, the two latches 142 can have a similar construction, and may be respectively assembled with the seat portion 108 for sliding movement along the pivot axis Y (i.e., defined by the pivot connections P7) extending transversally from the left to the right side of the seat portion 108. For example, each latch 142 can have a guide slot 147, and the seat portion 108 can have a shaft portion 149 slidably assembled through the guide slot 147, thereby guiding the sliding movement of the latch 142 transversally along the pivot axis Y. Each of the two latches 142 can include two locking portions 150 and 152 that are respectively disposed at two sides of the pivot connection P7 (i.e., in front of and behind the pivot connection P7) that pivotally couples the support frame portion 110 with the seat portion 108. The two locking portions 150 and 152 can be provided as lateral protruding portions that are fixedly connected with the latch 142 and project at one side of the latch 142. According to one example of construction, the latch 142 may be formed integrally with the two locking portions 150 and 152 as a single part. The two side segments 136 of the support frame portion 110 can selectively engage with the locking portions 150 of the two latches 142 (as better shown in FIGS. 6 and 7) for locking the infant stroller apparatus 100 in the unfolded state, or with the locking portions 152 of the two latches 142 (as better shown in FIG. 9) for locking the infant stroller apparatus 100 in the collapsed state.

Each of the two springs 144 can have two ends respectively connected with one latch 142 associated therewith and the seat portion 108. For example, each spring 144 can have a first end connected with one shaft portion 149 of the seat portion 108, and a second end connected with the corresponding latch 142. The two springs 144 can respectively bias the two latches 142 toward the locking state for engagement with the support frame portion 110.

Referring again to FIGS. 2, 5 and 6, the linking part 146 can be assembled with the seat portion 108 for sliding along a lengthwise axis L extending from a rear to a front of the seat portion 108, and can be respectively in sliding contact with each of the two latches 142. More specifically, the linking part 146 can be disposed between the two latches 142, and the two latches 142 can be respectively in sliding contact with two slots 154 that are respectively provided on a left and a right side region of the linking part 146 in a symmetric manner. Each slot 154 can define two ramp surfaces 154A and 154B that are connected with each other at an inflection region 154C of the slot 154, and each latch 142 can have a protrusion 156 in sliding contact with one corresponding slot 154 associated therewith.

The release actuator 148 can be pivotally connected with the seat portion 108, and can be operatively connected with the two latches 142 via the linking part 146. According to one example of construction, the release actuator 148 can be disposed in an opening 158 provided in the seat portion 108, and can be provided as a rigid handle pivotally connected with a transversal segment 134A of the reinforcing tube 134 at a rearward location relative to the pivot axis Y. The release actuator 148 can thereby rotate about a pivot axis A extending transversally from the left side to the right side of the seat portion 108. Moreover, the release actuator 148 can have one or more shaft portion 159 radially offset from the pivot axis A that is assembled pivotally and slidably through one or more corresponding elongated slot 160 provided on the linking part 146, the elongated slot 160 extending along a direction generally perpendicular to the seat surface 108A.

Figure 7:
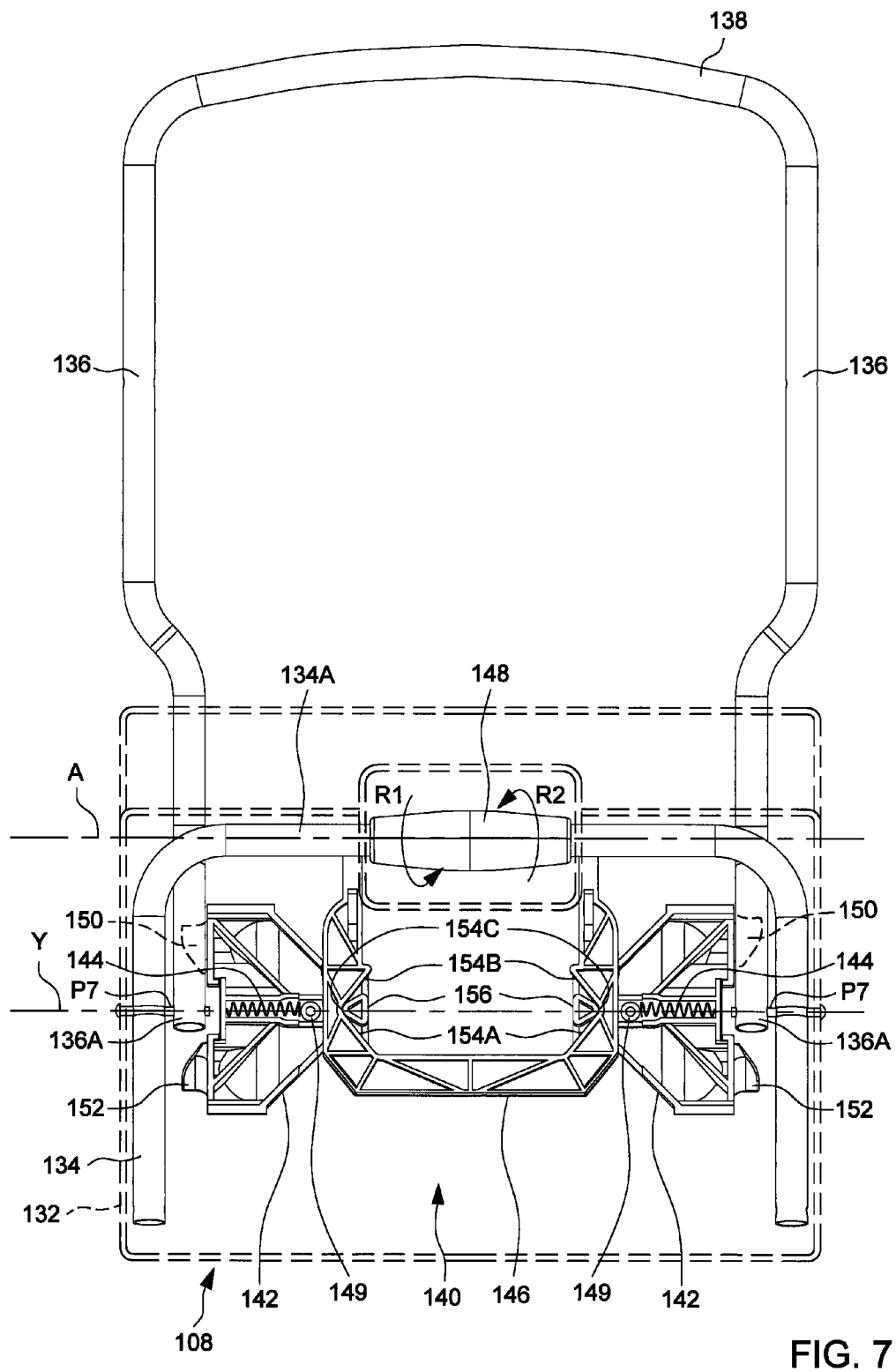
FIG. 7 is a schematic view illustrating the latch mechanism locking in an unfolded state.

In conjunction with FIGS. 2, 5 and 6, FIGS. 7-9 are schematic views illustrating various states of the latch mechanism 140. Referring to FIG. 7, the engagement between the locking portion 150 (shown with phantom lines) of each latch 142 and one corresponding side segment 136 of the support frame portion 110 can block relative rotation between the seat portion 108 and the support frame portion 110, and thereby locks the infant stroller apparatus 100 in the unfolded state. In particular, the locking portion 150 of the latch 142 can engage with a first side (e.g., an underside) of the corresponding side segment 136, so that the support frame portion 110 is restrictedly positioned between the seat surface 108A and the locking portion 150 of the latch 142. The other locking portion 152 of the latch 142 is not engaged with the support frame portion 110 while the infant stroller apparatus 100 is locked in the unfolded state.

Figure 9:
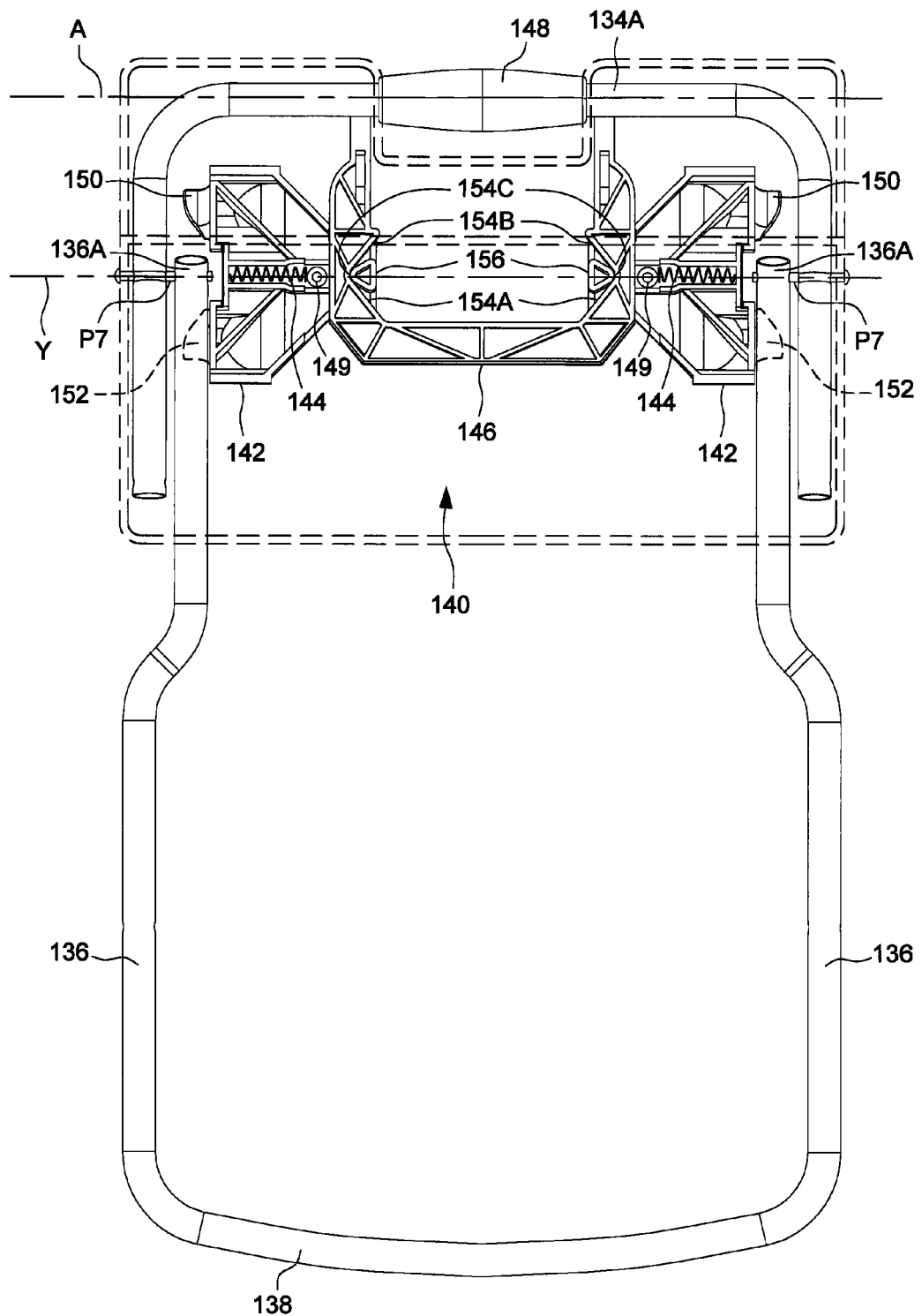
FIG. 9 is a schematic view illustrating the latch mechanism locking in a collapsed state.

Referring to FIG. 9, the engagement between the locking portion 152 (shown with phantom lines) of each latch 142 and one corresponding side segment 136 of the support frame portion 110 can block relative rotation between the seat portion 108 and the support frame portion 110 for locking the infant stroller apparatus 100 in the collapsed state. In particular, the locking portion 152 of the latch 142 can engage with a second side of the corresponding side segment 136 opposite to the aforementioned first side, so that the support frame portion 110 is restrictedly positioned between the seat surface 108A and the locking portion 152 of the latch 142. The other locking portion 150 of the latch 142 is not engaged with the support frame portion 110 while the infant stroller apparatus 100 is locked in the collapsed state.

As shown in FIGS. 7 and 9, the protrusion 156 of each latch 142 can be in the inflection region 154C of the corresponding slot 154 when the latches 142 biased by the springs 144 remain engaged with the support frame portion 110 for locking the infant stroller apparatus 100 in the unfolded or collapsed state.

Figure 8:
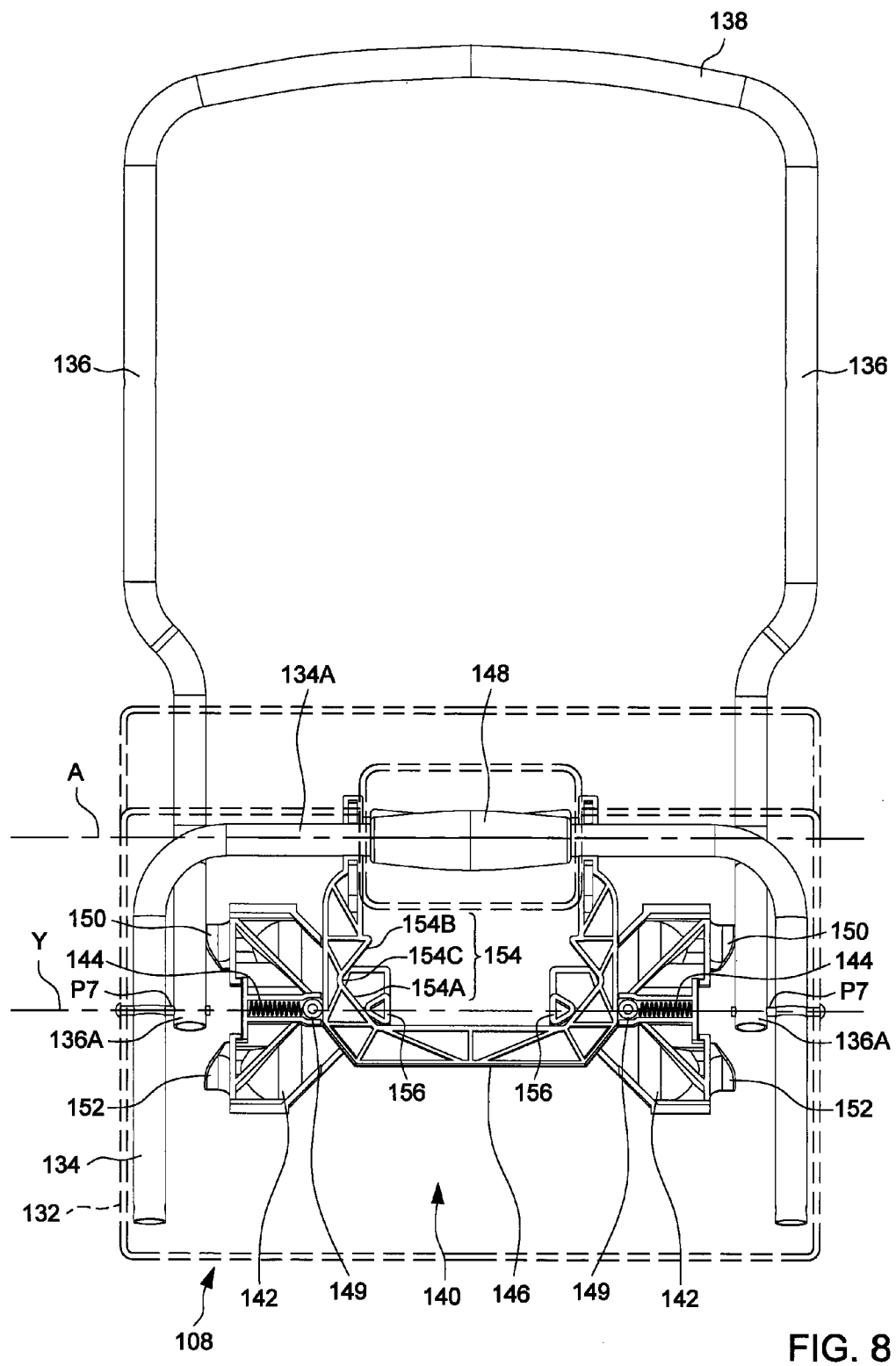
FIG. 8 is a schematic view illustrating the latch mechanism in an unlocking state.

In order to unlock the infant stroller apparatus 100 for folding or unfolding operation, the release actuator 148 is operable to rotate in either direction about the pivot axis A relative to the seat portion 108 to urge the linking part 146 to slide relative to the seat portion 108 along the lengthwise axis L, which in turn can drive the two latches 142 to slide transversally toward each other for disengaging from the support frame portion 110. For example, a rotation of the release actuator 148 in a first direction R1 (as shown in FIG. 7) can urge the linking part 146 to slide in a direction that causes the protrusion 156 of each latch 142 to slide in contact with the ramp surface 154A of the corresponding slot 154 away from the inflection region 154C (as shown in FIG. 8), whereby the two latches 142 can be urged to slide transversally toward each other against the biasing force of the springs 144 for disengaging from the support frame portion 110.

Alternatively, a rotation of the release actuator 148 in a second direction R2 opposite to the direction R1 can urge the linking part 146 to slide in another direction that causes the protrusion 156 of each latch 142 to slide in contact with the other ramp surface 154B of the corresponding slot 154 away from the inflection region 154C, which likewise urge the two latches 142 to slide transversally toward each other for disengaging from the support frame portion 110. Regardless whether the infant stroller apparatus 100 is in the unfolded or collapsed state, the release actuator 148 thus can be rotated in either direction R1 or R2 to unlock the latch mechanism 140.

As shown in FIG. 5, the locking portions 150 and 152 may further have downward ramp surfaces 150A and 152A, respectively. While the support frame portion 110 rotates toward the unfolded or collapsed state, the side segments 136 of the support frame portion 110 may respectively push against the ramp surfaces 150A or 152A and thereby urge the latches 142 to slide inwardly toward each other, which may facilitate disengagement of the latch mechanism 140 for continuous movement of the support frame portion 110 until it effectively reaches the unfolded or collapsed state.

Exemplary operation for folding and unfolding the infant stroller apparatus 100 is described hereinafter with reference to FIGS. 1-9. While the infant stroller apparatus 100 is in the unfolded state as shown in FIGS. 1-3, the two springs 144 can respectively bias the two latches 142 to the locking state for engagement with an underside of the support frame portion 110. More specifically, the locking portions 150 of the two latches 142 can respectively engage with the two side segments 136 of the support frame portion 110, which is unfolded and extends generally at a rear of the seat portion 108 as schematically shown in FIGS. 5 and 7. The infant stroller apparatus 100 is thereby locked in the unfolded state.

For folding the infant stroller apparatus 100, a caregiver can rotate the release actuator 148 in either of the two directions R1 and R2 shown in FIG. 7. This rotation of the release actuator 148 can drive the linking part 146 to slide along the lengthwise axis L, which causes the protrusion 156 of each latch 142 to slide in contact with the ramp surface 154A or 154B of the corresponding slot 154 away from the inflection region 154C. The two latches 142 are thereby urged to slide transversally toward each other for disengaging from the support frame portion 110 and unlocking the infant stroller apparatus 100. While continuously holding the release actuator 148, the caregiver then can lift the unlocked infant stroller apparatus 100 above a floor surface. Gravity action then can apply to the unlocked infant stroller apparatus 100 for causing its self folding to the collapsed state as shown in FIG. 4.

Once the infant stroller apparatus 100 is in the collapsed state, the caregiver can release the release actuator 148. The biasing force applied by the springs 144 can cause the two latches 142 to slide transversally away from each other so that the locking portions 152 of the two latches 142 can respectively engage with the two side segments 136 of the support frame portion 110, which is folded as shown in FIGS. 4 and 9 so as to extend beyond a front of the seat portion 108. As the latches 142 recover the locking state, the linking part 146 and the release actuator 148 can recover their respective initial positions owing to the symmetric geometry of the slots 154 and the biasing force of the springs 144, and the protrusion 156 of each latch 142 can be positioned adjacent to the inflection region 154C of the corresponding slot 154 on the linking part 146. The infant stroller apparatus 100 can be thereby locked in the collapsed state. While the infant stroller apparatus 100 is in the collapsed state, the release actuator 148 is located at a high position at the center of the infant stroller apparatus 100, which allows easy access to the release actuator 148. Accordingly, a caregiver may easily hold the release actuator 148 serving as a carry handle with one hand for transporting the collapsed infant stroller apparatus 100.

For unfolding the infant stroller apparatus 100, a caregiver can rotate the release actuator 148 in either of the two directions R1 and R2 as previously described. Likewise, this rotation of the release actuator 148 can drive the linking part 146 to slide along the lengthwise axis L, which causes the protrusion 156 of each latch 142 to slide in contact with the ramp surface 154A or 154B of the corresponding slot 154 away from the inflection region 154C. The two latches 142 are thereby urged to slide transversally toward each other for disengaging from the support frame portion 110 and unlocking the infant stroller apparatus 100. While continuously holding the release actuator 148, the caregiver then can unfold the unlocked infant stroller apparatus 100 to the unfolded state as shown in FIGS. 1-3 by pushing downward on the release actuator 148. Because the release actuator 148 is positioned between the two side segments 112 of the front leg frame 102 and the two side segments 116 of the handle frame 104 in the collapsed state of the infant stroller apparatus 100, the unfolding operation is easy to maneuver with the release actuator 148. Therefore, the downward pushing action can easily separate the front leg frame 102 and the handle frame 104 away from each other. Once the infant stroller apparatus 100 is in the unfolded state, the caregiver can release the release actuator 148. The two latches 142 then can engage with the support frame portion 110 like previously described, thereby locking the infant stroller apparatus 100 in the unfolded state.

Advantages of the structures described herein include the ability to provide an infant stroller apparatus that can be conveniently collapsed and unfolded for use. Moreover, the infant stroller apparatus can include a release actuator that can be easily grasped with one hand for unlocking the infant stroller apparatus and conducting folding or unfolding of the infant stroller apparatus.

Realization of the infant stroller apparatus has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. An infant stroller apparatus comprising:
   a front leg frame having a first side segment;
   a handle frame having a second side segment pivotally coupled with the first side segment via a first pivot connection;
   a rear leg frame having a third and a fourth side segment pivotally coupled with each other via a second pivot connection, the third side segment being further pivotally coupled with the first side segment via a third pivot connection, and the fourth side segment being further pivotally coupled with the second side segment via a fourth pivot connection;
   a seat portion pivotally coupled with the first side segment via a fifth pivot connection;
   a support frame portion respectively coupled with the seat portion and the fourth side segment;
   a latch assembled with the seat portion, the latch being movable to engage with the support frame portion for locking the infant stroller apparatus in an unfolded state, and to disengage from the support frame portion for movement of the infant stroller apparatus between the unfolded state and a collapsed state; and
   a release actuator pivotally connected with the seat portion and operatively connected with the latch, the release actuator being rotatable in either direction relative to the seat portion to cause the latch to move for disengaging from the support frame portion.

2. The infant stroller apparatus according to claim 1, wherein the rear leg frame has a rear wheel assembly, and the second pivot connection is located near the rear wheel assembly.

3. The infant stroller apparatus according to claim 1, wherein the support frame portion is pivotally coupled with the fourth side segment via a sixth pivot connection that is located between the second and fourth pivot connections.

4. The infant stroller apparatus according to claim 3, wherein the support frame portion is further pivotally coupled with the seat portion via a seventh pivot connection.

5. The infant stroller apparatus according to claim 3, wherein the first pivot connection is located above the third pivot connection and the sixth pivot connection when the infant stroller apparatus is in the unfolded state.

6. The infant stroller apparatus according to claim 1, wherein the first pivot connection is located vertically between the third pivot connection and the fourth pivot connection when the infant stroller apparatus is in the unfolded state.

7. The infant stroller apparatus according to claim 1, wherein the first side segment, the second side segment, the third side segment and the fourth side segment define a triangular frame geometry when the infant stroller apparatus is in the unfolded state, the second, third and fourth pivot connections being respectively adjacent to three apexes of the triangular frame geometry.

8. The infant stroller apparatus according to claim 1, wherein the third and fourth side segments are positioned substantially parallel and adjacent to each other between the first side segment and the second side segment when the infant stroller apparatus is in the collapsed state.

9. The infant stroller apparatus according to claim 1, wherein the latch is further operable to engage with the support frame portion for locking the infant stroller apparatus in the collapsed state.

10. The infant stroller apparatus according to claim 9, wherein the latch includes a first and a second locking portion respectively disposed at two sides of a pivot connection that pivotally couples the support frame portion with the seat portion, the first locking portion of the latch engaging with the support frame portion for locking the infant stroller apparatus in the unfolded state, and the second locking portion of the latch engaging with the support frame portion for locking the infant stroller apparatus in the collapsed state.

11. The infant stroller apparatus according to claim 10, wherein the seat portion has a seat surface, and the support frame portion is restrictedly positioned between the seat surface and the first locking portion of the latch in the unfolded state, and between the seat surface and the second locking portion of the latch in the collapsed state.

12. The infant stroller apparatus according to claim 1, wherein the latch is slidable along an axis extending transversally from a left to a right side of the seat portion.

13. The infant stroller apparatus according to claim 1, wherein the seat portion has an opening, and the release actuator is disposed in the opening of the seat portion.

14. The infant stroller apparatus according to claim 1, wherein the support frame portion is pivotally coupled with the seat portion about a pivot axis, and the release actuator is pivotally connected with the seat portion at a rearward location relative to the pivot axis.

15. The infant stroller apparatus according to claim 1, further including a linking part connected with the release actuator and assembled with the seat portion for sliding along a lengthwise axis extending from a rear to a front of the seat portion, the linking part having a sliding contact with the latch, the release actuator being rotatable relative to the seat portion to urge the linking part to slide and cause the latch to disengage from the support frame portion.

16. The infant stroller apparatus according to claim 15, wherein the linking part has a slot defining a first and a second ramp surface connected with each other at an inflection region of the slot, and the latch has a protrusion in sliding contact with the slot, the protrusion being in the inflection region when the latch is engaged with the support frame portion, and the protrusion sliding away from the inflection region and in contact with the first or second ramp surface when the latch disengages from the support frame portion.

17. The infant stroller apparatus according to claim 1, wherein the support frame portion is a basket frame.

18. An infant stroller apparatus comprising:
  a front leg frame;
  a handle frame pivotally coupled with the front leg frame;
  a rear leg frame having two side segments respectively coupled pivotally with the front leg frame and the handle frame;
  a seat portion pivotally coupled with the front leg frame;
  a support frame portion respectively coupled pivotally with the seat portion and the rear leg frame; and
  a latch assembled with the seat portion, the latch being movable to engage with the support frame portion to lock the infant stroller apparatus in an unfolded state and a collapsed state, the latch being further movable to disengage from the support frame portion for movement of the infant stroller apparatus between the unfolded state and the collapsed state.

19. The infant stroller apparatus according to claim 18, wherein the rear leg frame has a rear wheel assembly, and the two side segments are pivotally connected with each other at a location near the rear wheel assembly.

20. The infant stroller apparatus according to claim 19, wherein the two side segments of the rear leg frame are positioned substantially parallel and adjacent to each other between the front leg frame and the handle frame when the infant stroller apparatus is in the collapsed state.

21. The infant stroller apparatus according to claim 18, wherein the latch includes a first and a second locking portion respectively disposed at two sides of a pivot connection that pivotally couples the support frame portion with the seat portion, the first locking portion of the latch engaging with the support frame portion for locking the infant stroller apparatus in the unfolded state, and the second locking portion of the latch engaging with the support frame portion for locking the infant stroller apparatus in the collapsed state.

22. The infant stroller apparatus according to claim 21, wherein the seat portion has a seat surface, and the support frame portion is restrictedly positioned between the seat surface and the first locking portion of the latch in the unfolded state, and between the seat surface and the second locking portion of the latch in the collapsed state.

23. The infant stroller apparatus according to claim 18, wherein the support frame portion is pivotally coupled with the seat portion about a pivot axis that extends transversally from the left side to the right side of the seat portion, and the latch is slidable along the pivot axis.

24. The infant stroller apparatus according to claim 23, further including a release actuator pivotally connected with the seat portion and operatively connected with the latch, the release actuator being rotatable in either direction relative to the seat portion to cause the latch to slide for disengaging from the support frame portion.

25. The infant stroller apparatus according to claim 24, wherein the seat portion has an opening, and the release actuator is disposed in the opening of the seat portion.

26. The infant stroller apparatus according to claim 24, wherein the support frame portion is pivotally coupled with the seat portion about a pivot axis, and the release actuator is pivotally connected with the seat portion at a rearward location relative to the pivot axis.

27. The infant stroller apparatus according to claim 24, further including a linking part connected with the release actuator and assembled with the seat portion for sliding along a lengthwise axis extending from a rear to a front of the seat portion, the linking part having a sliding contact with the latch, the release actuator being rotatable relative to the seat portion to urge the linking part to slide and cause the latch to disengage from the support frame portion.

28. The infant stroller apparatus according to claim 27, wherein the linking part has a slot defining a first and a second ramp surface connected with each other at an inflection region of the slot, and the latch has a protrusion in sliding contact with the slot, the protrusion being in the inflection region when the latch is engaged with the support frame portion, and the protrusion sliding away from the inflection region along the first or second ramp surface when the latch disengages from the support frame portion.

29. The infant stroller apparatus according to claim 18, wherein the support frame portion is a basket frame.

* * * * *